United States Patent [19]

Sakurai

[11] Patent Number: 4,907,107
[45] Date of Patent: Mar. 6, 1990

[54] METHOD FOR POSITIONING A MAGNETIC HEAD IN ACCORDANCE WITH DIGITAL PEAK VALUES CORRESPONDING TO SERVO DATA AND MAGNETIC DISK POSITIONING APPARATUS FOR THE SAME

[75] Inventor: Tetsuji Sakurai, Oome, Japan

[73] Assignee: Kabushiki Kaisha Toshiba, Kawasaki, Japan

[21] Appl. No.: 250,857

[22] Filed: Sep. 29, 1988

[30] Foreign Application Priority Data

Sep. 30, 1987 [JP] Japan ................. 62-246055

[51] Int. Cl.$^4$ ............................................. G11B 5/596
[52] U.S. Cl. .............................. 360/77.04; 360/77.05; 360/75; 369/32
[58] Field of Search .................... 360/77.04, 77.05, 75; 369/32, 47–49

[56] References Cited

U.S. PATENT DOCUMENTS 4,419,701 12/1983 Harrison et al. ............... 360/77.08
4,488,189 12/1984 Axmear et al. ................. 360/78.06
4,737,869 4/1988 Sugaya et al. .................. 360/77.08

Primary Examiner—Alan Faber
Assistant Examiner—David L. Robertson
Attorney, Agent, or Firm—Oblon, Spivak, McClelland, Maier & Neustadt

[57] ABSTRACT

A magnetic disk driving apparatus comprises a driving section for driving a magnetic head on a destination track, in response to an input drive instruction, a detecting section for detecting peak values of signal components corresponding to servo data read out from the magnetic disk by the magnetic head, and a controller for generating a drive instruction in accordance with a plurality of selected peak values of the detected peak values to output the generated instruction to said driving section.

13 Claims, 6 Drawing Sheets

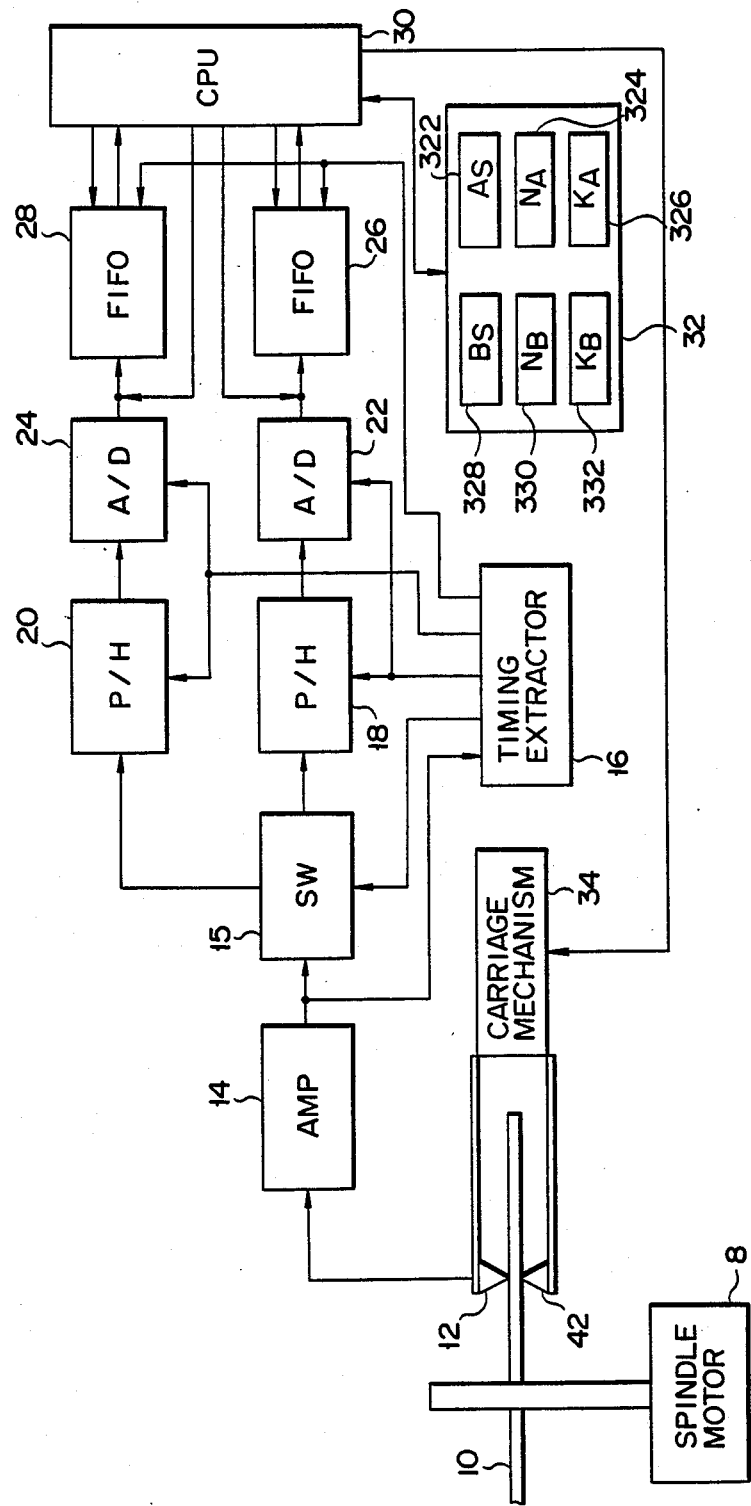
F I G. 1

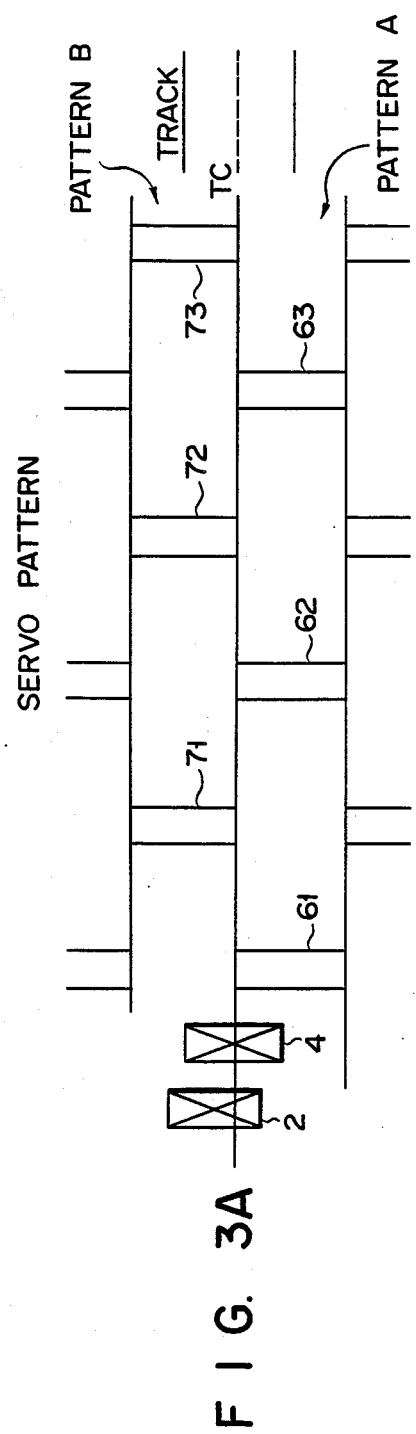
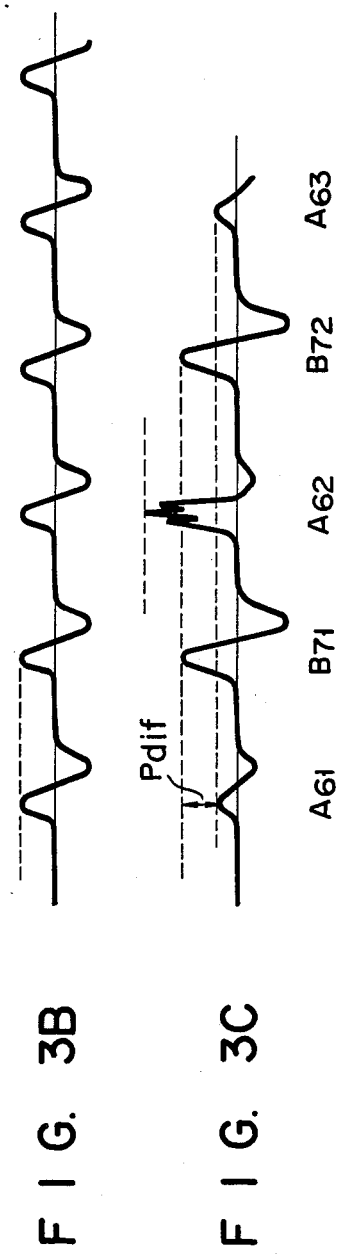
F I G. 3A
F I G. 3B
F I G. 3C

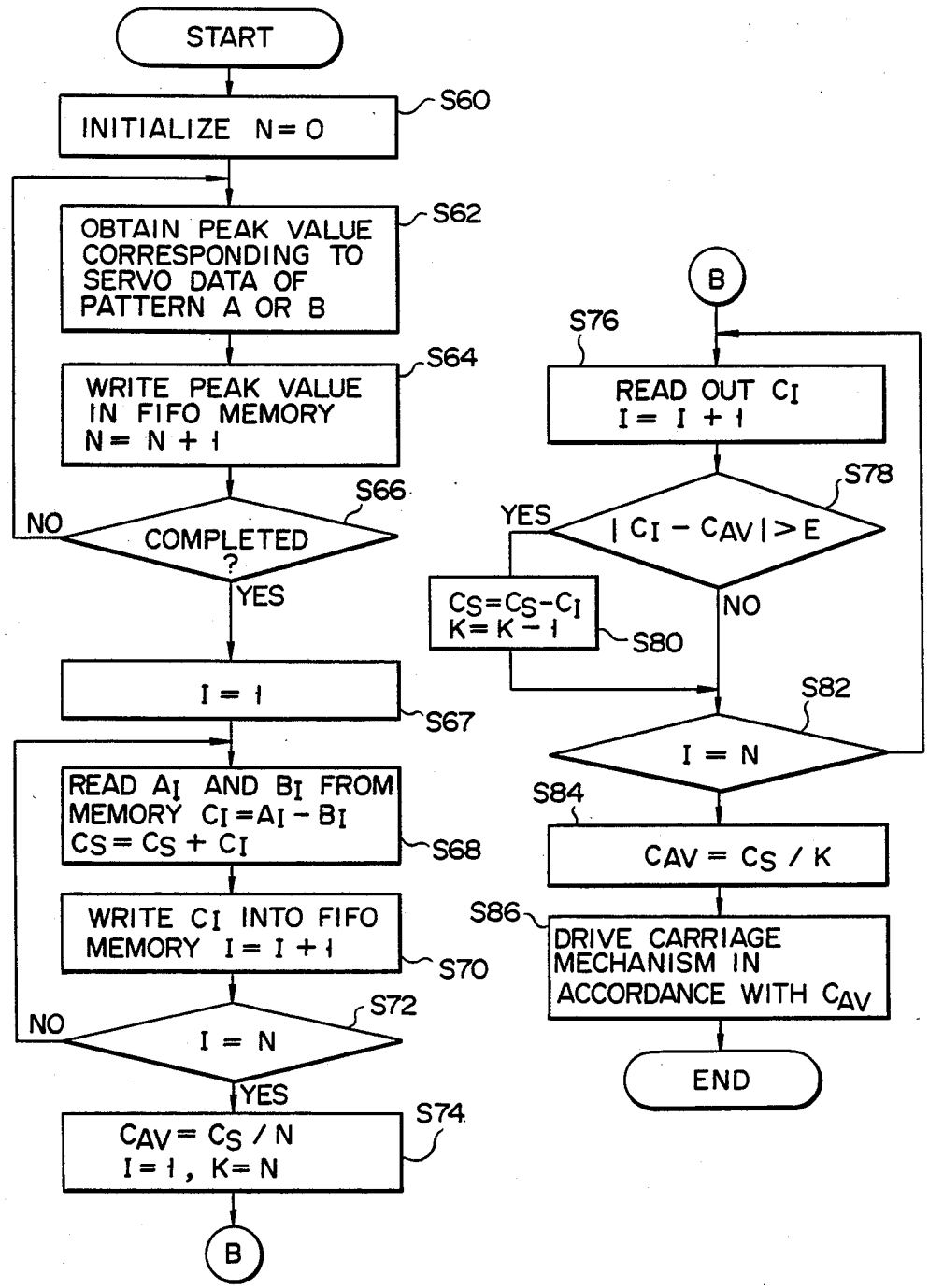
F I G. 5

METHOD FOR POSITIONING A MAGNETIC HEAD IN ACCORDANCE WITH DIGITAL PEAK VALUES CORRESPONDING TO SERVO DATA AND MAGNETIC DISK POSITIONING APPARATUS FOR THE SAME

BACKGROUND OF THE INVENTION

1. Field of the Invention

The present invention relates to a method for accurately positioning a magnetic head on a destination track of a magnetic disk and a magnetic disk driving apparatus for implementing the method.

2. Description of the Related Art

In order to position a magnetic head on a destination track of a magnetic disk in a conventional magnetic disk device, the magnetic disk has been used on which, for example, a servo pattern is recorded. The servo pattern is comprised of, for example, two patterns, each of which exists at one side with respect to a track center. Two signals are read from the two patterns. When the magnetic head is positioned off from the center of a desired track, the signals read from the two patterns are such that the signal corresponding to one of the patterns has a peak value larger than the signal corresponding to the other pattern. On the other hand, when the head is positioned right over the center of the desired track, the signals corresponding to the patterns have an equal peak value. Thus, by moving the magnetic head until the signal corresponding to one of the patterns and the signal corresponding to the other of the patterns have equal peak values, the magnetic head can be positioned right over the center of a desired track.

A known method for improving the positional accuracy of the magnetic head is one in which peak values obtained for each of the patterns are averaged for subsequent comparison. This method permits accurate measurement of the amount of positional deviation of the magnetic head from a given track center. On the other hand, if error signals arise due to the disturbance and disk deficiencies at the servo pattern portions, the signals read from the patterns and hence the average values could have abnormal values. This would move the magnetic head to an erroneous position.

SUMMARY OF THE INVENTION

It is accordingly an object of the present invention to provide a method of accurately positioning a magnetic head on a destination track of a magnetic medium and a magnetic disk driving apparatus for implementing the method.

The magnetic disk driving apparatus according to the invention comprises a driving section for driving the magnetic head on the destination track, in accordance with an input drive instruction, a detecting section for detecting peak values of signal components corresponding to servo data read out from the magnetic disk by the magnetic head, and a controller for generating a drive instruction on the basis of a plurality of peak values selected from among the peak values detected, and outputting the drive instruction to the driving section.

The positioning method of the present invention comprises the steps of the reading out, by the magnetic head, of servo data from the magnetic disk, in order to detect peak values of signal components corresponding to the servo data, generating a drive instruction on the basis of a plurality of peak values selected from among the peak values detected, and driving the magnetic head on the destination track, in accordance with the drive instruction.

According to the magnetic disk driving apparatus of the present invention, as described above, since abnormal values due to the deficiencies of the servo pattern surface of a recording disk and the disturbance are removed for subsequent average processing, the accurate positioning of the head is always possible.

BRIEF DESCRIPTION OF THE DRAWINGS

FIG. 1 is a block diagram of a magnetic disk device according to a first embodiment of the present invention;

FIGS. 3A through 3C are diagrams for explaining position control;

FIG. 5 is a flowchart for explaining the operation of the second embodiment.

DETAILED DESCRIPTION OF THE PREFERRED EMBODIMENTS

Figure 2A:
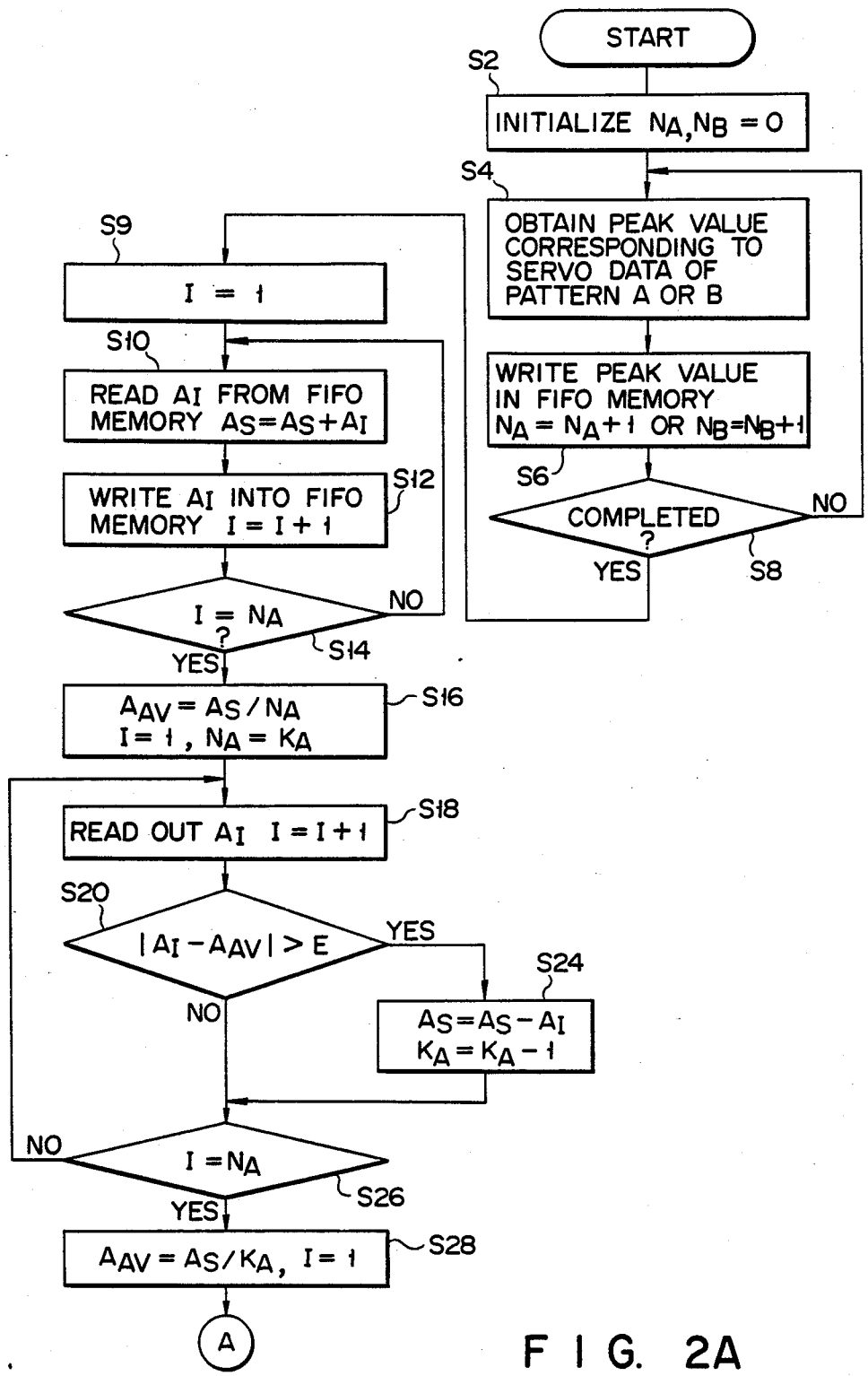
FIGS. 2A and 2B are flowcharts for explaining the operation of the first embodiment.

First, a first embodiment of the present invention will be described with reference to FIG. 1.

A magnetic disk 10 is rotated by spindle motor 8. As shown in FIG. 3A a servo pattern comprising two patterns, each of which exists at one side with respect to track center TC, is recorded on disk 10. In this embodiment, the disk is assumed to be a floppy disk, on whose servo data surface the servo pattern is embedded, of a so-called sector servo system. Magnetic disk 10 may be of servo-surface-servo type or may be a hard disk. In the servo-surface-servo type of magnetic disk, the servo data is read out from a recording surface different from a data recording surface or another magnetic disk by a special head which is drived by an actuator along with the magnetic read/write head.

Magnetic heads 12 and 42 are supported by a carriage mechanism 34 to be positioned on destination tracks in accordance with a drive instruction from CPU 30. Signals corresponding to servo data 61–63 and 71–73 read from magnetic disk 10 by magnetic head 12, for example, are amplified in amplifier 14 and then applied to timing extractor 16. Timing extractor 16 generates various control signals from the amplified signals.

Switch 15 is responsive to a switching control signal from timing extractor 16 to feed the amplified signals corresponding to servo data 61–63 in pattern A to a peak hold circuit (P/H) 18 and to feed amplified signals corresponding to servo data 71–73 in pattern B to a peak hold circuit (P/H) 20. Peak hold circuits 18 and 20 hold peak values of the amplified signals in response to hold control signals from timing extractor 16, respectively. The peak values held by peak hold circuits 18 and 20 are converted to digital data by analog-to-digital (A/D) converters 22 and 24 in accordance with conversion control signals from timing extractor 16, respectively, and then stored into first-in first-out (FIFO) memories 26 and 28 in accordance with write control signals from timing extractor 16, respectively.

Upon the completion of reading out of the predetermined servo data, CPU 30 reads the peak values from FIFO memories 26 and 28 and adds separately these values. When the addition is completed, CPU 30 issues write control signals to store these peak values in FIFO memories 26 and 28. The number of pieces of the servo data is predetermined, and data on the number of the servo data are stored in registers 324 and 330 in memory 32. When the addition is completed for all the servo data, sum values $A_S$ and $B_S$ are stored in registers 322 and 328, respectively. In addition, average values $A_{AV}$ and $B_{AV}$ are calculated from the sum values $A_S$ and $B_S$, respectively. The peak values are sequentially read out from FIFO memories 26 and 28 to select peak values falling within predetermined error E from the average values $A_{AV}$ and $B_{AV}$. Average values are determined by the selected peak values again. Subsequently, a difference between the average values thus determined is calculated, and a drive signal is applied to carriage mechanism 34 in accordance with the difference. Through the carriage mechanism, head 12 can be accurately positioned on a destination track.

Figure 2B:
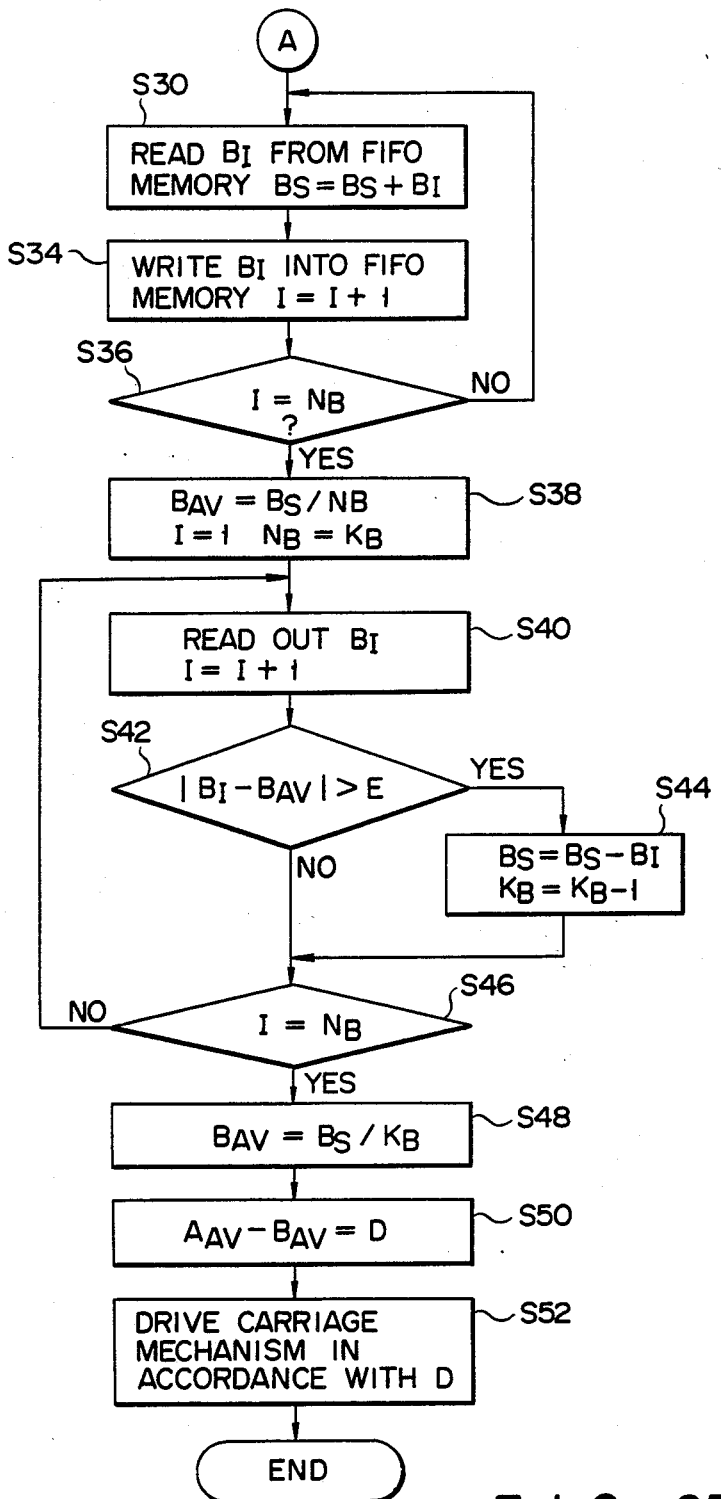

The operation of the first embodiment will be described with reference to FIGS. 2A and 2B.

Magnetic disk 10 is rotated by spindle motor 8. On disk 10 the same pattern as the servo pattern shown in FIG. 3A is recorded. When a seek instruction is input to CPU 30, the initialization is performed in step S2. For example, the values $N_A$ and $N_B$ are set to be 0.

Also, values $A_S$ and $B_S$ are set to be 0. Magnetic head 12 is subjected to a speed control for movement to a destination track. When the head reaches near to the destination track, the control is switched from the speed control to the positioning control as shown in step S2 and the following steps. Assume now that head 12 is positioned on position 2 with respect to the destination track.

In step S4, servo data 61-63 and 71-73 are read from magnetic disk 10 by head 12 to generate servo signal corresponding to servo data 61-63 and 71-73. The servo signal is amplified in amplifier 14, and the signal shown in FIG. 3C is obtained. The amplified servo signal is applied to timing extractor 16. Switch 15 responds a switch control signal from timing extractor 16 to apply signal components corresponding to servo data 61-63 in pattern A to peak hold circuit 18 and signal components corresponding to servo data 71-73 in pattern B to peak hold circuit 20. One of the signal components applied to peak hold circuit 18 is held therein in accordance with a hold control signal, and the held peak value is converted to digital data by A/D converter 22 in response to a conversion control signal from timing extractor 16. The converted peak values are stored into FIFO memory 26 in response to a write control signal in step S6. At this time, the value $N_A$ indicative of the number of pieces of the servo data is incremented by one. The same processes are carried out for the servo signal components corresponding to servo data 71-73 in pattern B. In step S8, a decision is made as to whether or not the reading and writing operations have been completed for all the servo data. If NO in step S8, then the operations of steps S4 to S8 are repeated. If YES in step S8, then step S9 will be performed.

In step S9, a variable I is set to be "1". The number $N_A$ of the servo data 61-63 is stored in register 324. In step S10, peak value $A_I$ is read from FIFO memory 26 for addition to variable $A_S$. In step S12, the read peak value $A_I$ is stored into memory 26 again. At the same time, the variable I is incremented by one. Subsequently, a decision is made in step S14 as to whether the variable I is equal to the number $N_A$ of the servo data or not. If not equal, then the operations of steps S10 to S14 are repeated. If equal (YES) in step S14, then step S16 is carried out.

In step S16, an average value $A_{AV}(=A_S/N_A)$ for the servo data in pattern A is calculated. Subsequently, variable I is initialized to one, and value $N_A$ is set to variable $K_A$. The sum value $A_S$ is stored in register 322. In step S18, peak value $A_I$ is read from FIFO memory 26 again, and variable I is incremented by one. In step S20, a decision is made as to whether or not an absolute value of a difference between peak value $A_I$ and average value $A_{AV}$ is larger than predetermined error E. If the absolute value is smaller than error E, then step S26 is carried out. If the absolute value is larger than the error, then step S24 is carried out so that sum value $A_S$ is read out of register 322 and peak value $A_I$ is subtracted from sum value $A_S$. The result of the subtraction is stored in register 322. Variable $K_A$ stored in register 326 is decremented by one.

That is to say, of the peak values A61-A63 corresponding to the servo data 61-63, the peak values A61 and A63 are considered to fall within the margin of error E of average value $A_{AV}$ in step S20 and thus used for calculating the average value. On the other hand, peak value A62 due to the disturbance is excluded from the calculation of the average value because the result of the decision in step S20 based on the value A62 is YES.

Subsequently, in step S26, a decision is made as to whether variable I is equal to number $N_A$ of data stored in register 324. If not equal, the step S18 is carried out again. If equal, then a new average value $A_{AV}$ is calculated from sum value $A_S$ and variable $K_A$ and stored in register 322. At the same time, variable I is set to be one.

In steps S30 through S48, the same processes as those in steps S10 through S28 are carried out for the servo data 71-73 in pattern B. In this way, average values $A_{AV}$ and $B_{AV}$ are obtained.

In step S50, difference D between average values $A_{AV}$ and $B_{AV}$ is calculated, and a drive control signal is determined in accordance with difference D. Carriage mechanism 34 is driven by the determined drive control signal. As a result, average value $A_{AV}$ of peak values A61-A63 and average value $B_{AV}$ of peak values B71-B73 are made equal to each other, so that magnetic heads 12 and 42 can accurately be positioned on the destination tracks.

Next, a second embodiment of the magnetic disk driving apparatus of the present invention will be described.

Figure 4:
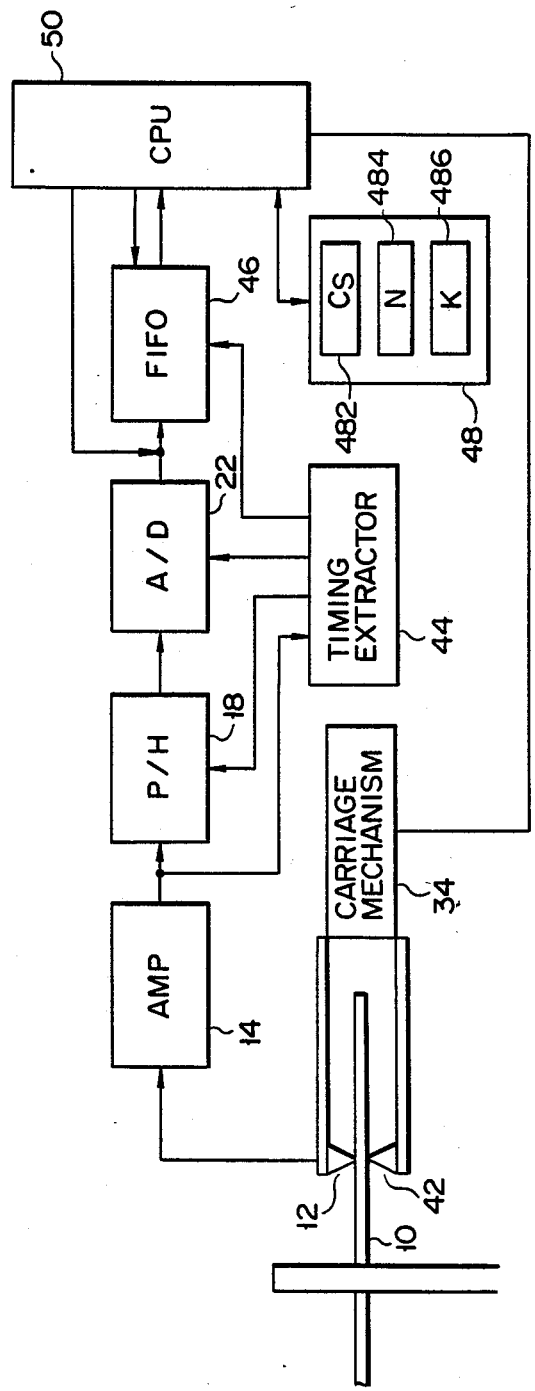
FIG. 4 is a block diagram of a magnetic disk device according to a second embodiment of the present invention.

The arrangement of the second embodiment will first be described with reference to FIG. 4. In the second embodiment, like reference numerals are used to denote like portions in the first embodiment, and the description thereof will be excluded.

In the second embodiment, peak values A61-A63 and B71-B73 corresponding to servo data 61-63 and 71-73 in servo patterns A and B are stored together in FIFO memory 46 in accordance with a write control signal from timing extractor 44 similar to extractor 16. CPU 50 similar to CPU 30 calculates differences between A61 and B71; A62 and B72; A63 and B73, and then drives carriage mechanism 34 in accordance with an average value $C_{AV}$ of the calculated differences.

In the operation of steps S60 through S66 shown in FIG. 5 the same processes as those in steps S2 through S8 in the first embodiment are performed. In the second embodiment, single FIFO memory 46 is used, so that peak values A61–A63 and B71–B73 are alternately stored into FIFO memory 46. If the storage of the servo data into FIFO memory 46 is completed in step S66, then variable I is set to be one in step S67.

Steps S68 through S72 are the same as steps S10 through S14 in the first embodiment. In the first embodiment the peak values are separately added while, in the second embodiment, a difference between peak values A61 and B71 is first obtained and then the difference is added to value $C_S$ in step S68. If, in step S72, it is decided that the addition is completed, then average value $C_{AV}$ is calculated and value $C_S$ is stored in register 482 in memory 48 similar to memory 32. Number N of the servo data has been stored in register 484 in step S74.

When average value $C_{AV}$ is obtained, the same processes as those in steps S18 through S26 in the first embodiment are carried out for each difference obtained in step S68. As a result, even if error signals due to the disturbance, the deficiencies of magnetic disk 10, or the like are output from amplifier 14, they can be removed in steps S78 and S80. Sum value $C_S$ of normal differences alone is obtained in step S82, and then average value $C_{AV}$ is calculated in step S84.

In step S84, a drive control signal is determined in accordance with average value $C_{AV}$ of the differences. Carriage mechanism 34 is driven in accordance with the determined drive control signal. As a result, magnetic heads 12 and 42 are accurately positioned on the destination tracks as shown in FIG. 3B.

What is claimed is:

1. A magnetic disk positioning apparatus having a magnetic head and capable of accurately positioning said magnetic head on a destination track of a magnetic disk, comprising:
   storage means for storing digital peak values;
   detecting means for detecting peak values of analog signal components corresponding to servo data read out from said magnetic disk by said magnetic head, digitalizing the detected peak values to obtain the digital peak values and storing the digital peak value in said storage means;
   averaging means for creating a digital average value of the detected peak values of the analog signal components;
   control means for reading out the digital peak values from said storage means and generating a positioning instruction in accordance with a plurality of selected digital peak values from among the digital peak values read out from said storage means wherein said selected signals fall within a predetermined range from said created average value; and
   positioning means for positioning said magnetic head on the destination track in accordance with the positioning instruction generated by said control means.

2. An apparatus according to claim 1, wherein said control means includes means for selecting said plurality of selected digital peak values from among the read-out digital peak values in accordance with each of the read-out digital peak values, and for generating the positioning instruction from said plurality of selected digital peak values including first and second selected digital peak values to output the generated instruction to said positioning means.

3. An apparatus according to claim 2, wherein said control means comprises:

first selecting means for calculating a first average value of first digital peak values of the read-out digital peak values and for selecting, from among the first digital peak values, said first selected digital peak values which fall within a predetermined value with respect to the first average value; and
second selecting means for calculating a second average value of second digital peak values of the read-out digital peak values, and for selecting, from among the second digital peak values, said second selected digital peak values which fall within the predetermined value with respect to the second average value.

4. An apparatus according to claim 2, wherein said control means comprises:
   means for calculating a third average value from said first selected digital peak values;
   means for calculating a fourth average value from said second selected digital peak values;
   difference calculating means for calculating a difference between the third and fourth average values; and
   generating means for generating the positioning instruction in accordance with the difference.

5. An apparatus according to claim 1, wherein said storage means comprises first and second FIFO memory means for storing the first and second digital peak values, respectively, and said detecting means comprises:
   reading means for reading out the servo data from said magnetic disk by means of said magnetic head to generate the analog signal components;
   timing extraction means for extracting a switching control signal, first and second detect control signals, and first and second write control signals from the analog signal components;
   first digital peak detecting means for detecting the first digital peak values from the analog signal components in response to the first detect control signal from said timing extraction means, and for writing the first digital peak values into said first FIFO memory means in response to the first write control signal from said timing extraction means;
   second digital peak detecting means for detecting the second digital peak values from the analog signal components in response to the second detect control signal from said timing extracting means and for writing the second digital peak values into said second FIFO means in response to the second write control signal from said timing extraction means; and
   switching means for selectively outputting the analog signal components to one of said first and second peak detecting means in response to the switching signal from said timing extraction means.

6. An apparatus according to claim 1, wherein said detecting means comprises:
   reading means for reading out the servo data from said magnetic disk by means of said magnetic head to generate the analog signal components;
   timing extraction means for extracting a hold control signal and a write control signal from the analog signal components; and
   digital peak detecting means for detecting as the digital peak values the first and second digital peak values from the analog signal components in response to the detect control signal from said timing extraction means, and for writing the first and second digital peak values into said storage means in response to the write control signal from said timing extraction means.

7. An apparatus according to claim 1, wherein said control means comprises means for calculating respective differences between first and second digital peak values of the read-out digital peak values, for selecting a plurality of selected differences from the calculated differences in accordance with the calculated differences, for generating the positioning instruction from the plurality of selected differences, and for outputting the generated instruction to said positioning means.

8. An apparatus according to claim 7, wherein said control means comprises:
 means for calculating the respective differences between the first and second digital peak values;
 selecting means for calculating an average value of the calculated respective differences, and for selecting from the calculated respective differences the plurality of selected differences which fall within a predetermined value with respect to the average value; and
 means for generating the positioning instruction from the plurality of selected differences to output the generated instruction to said positioning means.

9. A method of accurately positioning a magnetic head on a destination track of a magnetic disk, said method comprising the steps of:
 reading out servo data from said magnetic disk by means of said magnetic head to detect digital peak values from analog signal components corresponding to the servo data;
 storing the digital peak values in a memory;
 calculating the digital average of said stored peak values;
 reading out the digital peak values from the memory to generate a drive instruction in accordance with a plurality of selected digital peak values of the read-out digital peak values wherein said selected digital peak value falls within a predetermined range from said calculated average value; and
 driving said magnetic head on the destination track in accordance with the drive instruction.

10. A method according to claim 9, wherein said generating of the drive instruction comprises the steps of:
 selecting said plurality of selected digital peak values form the read-out digital peak values in accordance with the read-out digital peak values; and
 generating the drive instruction from said plurality of selected digital peak values.

11. A method according to claim 9, wherein said generating of the drive instruction comprises the steps of:
 calculating a first average value of first digital peak values of the read-out digital peak values to select from among the first digital peak values first selected digital peak values which fall within a predetermined value with respect to the first average value; and
 calculating a second average value of second digital peak values of the read-out digital peak values to select from among the second digital peak values second selected digital peak values which fall within the predetermined value with respect to the second average value, said plurality of selected digital peak values comprising the first and second selected digital peak values.

12. A method according to claim 10, wherein said generating step comprises the steps of:
 calculating a third average value from first selected digital peak values and a fourth average value from second selected digital peak values, said plurality of selected digital peak values comprising the first and second selected digital peak values; and
 calculating a difference between the third and fourth average values to generate the drive instruction in accordance with the difference.

13. A method according to claim 9, wherein said detecting step comprises the step of:
 generating a switch control signal, first and second detect control signals, and first and second write control signals from the analog signal components;
 selectively receiving the analog signal components in response to the switch control signal;
 detecting first digital peak values from the received analog signal components in response to the first detect control signal;
 detecting second digital peak values from the received analog signal components in response to the second detect control signal;
 writing the detected first digital peak values into a first FIFO memory in response to the first write control signal; and
 writing the detected second digital peak values into a second FIFO memory in response to the second write control signal, the memory including the first and second FIFO memories.

* * * * *